United States Patent
Rouphael et al.

(10) Patent No.: US 7,469,612 B2
(45) Date of Patent: Dec. 30, 2008

(54) METHOD FOR DETERMINING AN ENGAGED RATIO IN A GEARBOX

(75) Inventors: Roger Rouphael, L'Union (FR); Benoit Hamm, Guignicourt sur Verce (FR)

(73) Assignee: Continental Automotive France, Toulouse (FR)

( * ) Notice: Subject to any disclaimer, the term of this patent is extended or adjusted under 35 U.S.C. 154(b) by 365 days.

(21) Appl. No.: 10/576,015

(22) PCT Filed: Aug. 18, 2004

(86) PCT No.: PCT/EP2004/009236

§ 371 (c)(1),
(2), (4) Date: May 31, 2006

(87) PCT Pub. No.: WO2005/038307

PCT Pub. Date: Apr. 28, 2005

(65) Prior Publication Data

US 2007/0129209 A1      Jun. 7, 2007

(30) Foreign Application Priority Data

Oct. 17, 2003   (FR) .................................. 03 12125

(51) Int. Cl.
*F16H 59/70*         (2006.01)

(52) U.S. Cl. ..................................... 74/336 R; 477/907
(58) Field of Classification Search ................. 477/907, 477/70, 73, 75
See application file for complete search history.

(56) References Cited

U.S. PATENT DOCUMENTS

| 4,642,771 A | 2/1987 | Hattori et al. |
| 5,921,135 A | 7/1999 | Friedrich et al. |
| 6,732,038 B2 * | 5/2004 | Runde et al. ................. 701/51 |

* cited by examiner

*Primary Examiner*—Rodney H Bonck
*Assistant Examiner*—Edwin A Young
(74) *Attorney, Agent, or Firm*—Young & Thompson

(57) ABSTRACT

The invention relates to a method for determining the speed of a vehicle with the aid of sensors on board said vehicle, whereby the vehicle is moved by an engine (6) coupled to a gear box (8), wherein the speed is determined by multiplying the value of the engine rpm obtained by a sensor by a predetermined coefficient as a function of the engaged gearbox ratio. The engaged gearbox ratio is determined during a change in gearbox ratio by dividing the values of the engine rpm measured just before and after the ratio change by each another and by comparing the result of said division with predetermined stored values which are dependent upon the gear box (8) with which the vehicle is fitted. The invention can be used to determine the speed of a vehicle in a degraded mode i.e. in the event of a speed sensor failure.

11 Claims, 1 Drawing Sheet

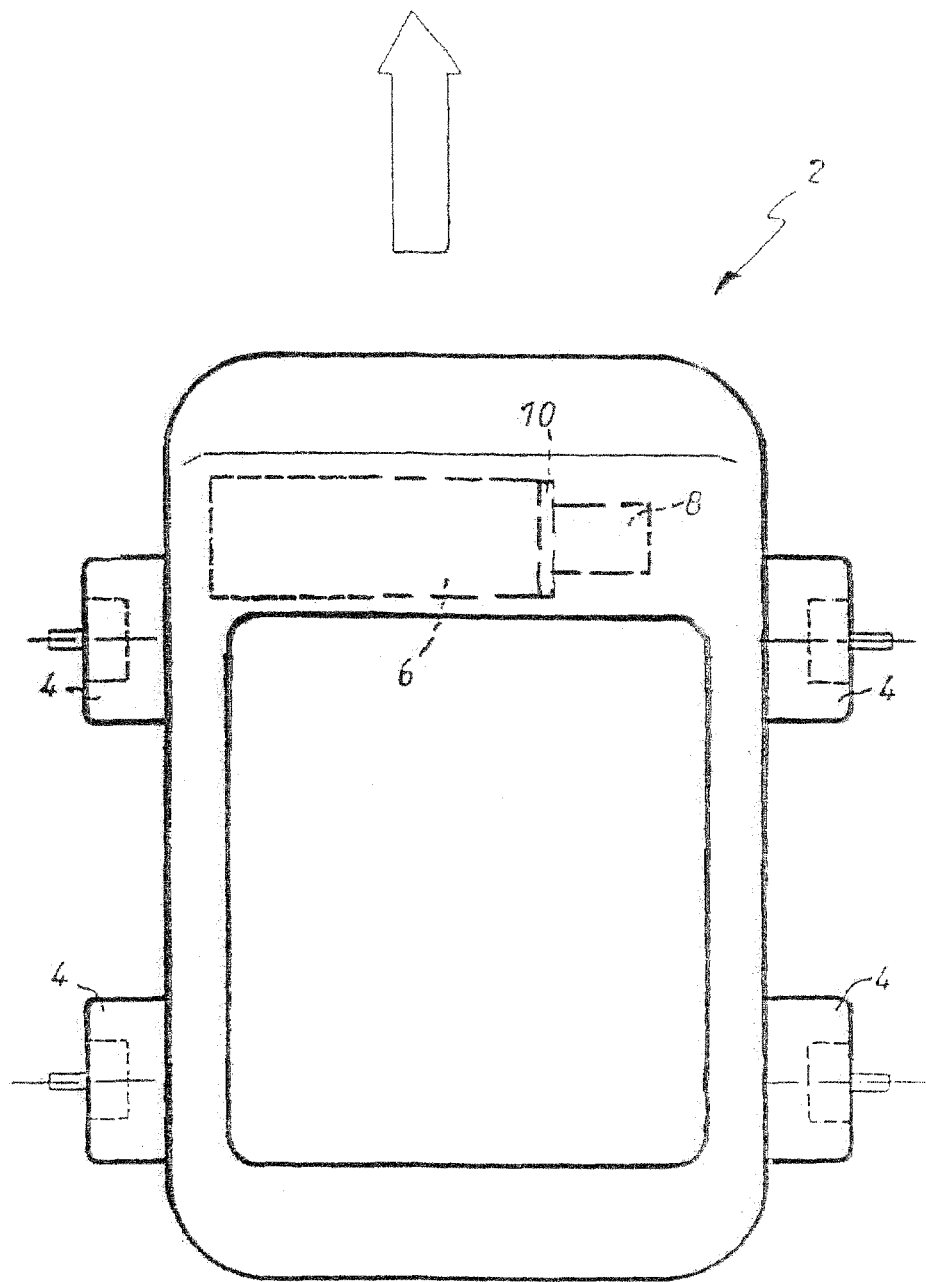

METHOD FOR DETERMINING AN ENGAGED RATIO IN A GEARBOX

FIELD OF THE INVENTION

The present invention relates to a method for determining the engaged box ratio in a gearbox of a motor vehicle and its application to determining the speed of this motor vehicle in degraded mode.

BACKGROUND OF THE INVENTION

On modern vehicles (automobiles, trucks, motorcycles, etc.) a sensor making it possible to determine the speed of the vehicle is provided. This sensor is imposed by most legislations to allow the driver to ascertain and control the speed of his vehicle. This sensor, however, is also used for the correct operation of electronic devices that use this data item, such as for example a speed regulator (cruise control device).

If the speed sensor fails, the driver of the vehicle does not know its speed (hence a possible risk of excess speed) and the onboard devices using this data become inoperative. Such devices are increasingly numerous on modern vehicles. Consequently, the information given by the speed sensor is becoming increasingly important. Thus, for example, the speed sensor makes it possible generally to determine the distance traveled by the vehicle. It therefore becomes impossible, in the event of failure of the speed sensor, to plan the maintenance operations that are determined according to the mileage.

Nowadays, to alleviate a failure of the speed sensor, it is known practice to provide a second sensor. The latter then takes over from the first when the first is defective. This solution is satisfactory except that its cost is relatively high. It may therefore be reserved only for top-of-the-range vehicles.

SUMMARY OF THE INVENTION

The problem at the origin of the present invention is to be able to alleviate the failure of a speed sensor without having to substantially increase the cost of the vehicle.

To resolve this problem, the invention proposes to calculate the speed based on the engine speed and the engaged gearbox ratio.

To this end, it proposes a method for determining the engaged box ratio in a gearbox, wherein the engaged gearbox ratio is determined when there is a change of gearbox ratio by dividing one by the other the values of the engine speed measured just before and just after the change of ratio and by comparing the result of this division with stored predetermined values that depend on the gearbox fitted to the vehicle.

A gearbox has an input shaft that is driven by the vehicle engine onto which it is mounted and an output shaft which drives the wheels of this vehicle. When a gear is engaged, the ratio of the rotation speed of the output shaft to the rotation speed of the input shaft (or vice versa) is a constant. The rotation speed of the input shaft corresponds to the engine speed and the rotation speed of the output shaft gives the rotation speed of the drive wheels of the vehicle which is proportional (besides slippage) to the speed of this vehicle. It is therefore sufficient to multiply the value of the engine speed by a constant which is a function of the engaged gear to obtain a sufficiently accurate value of the vehicle speed.

To determine the engaged gear, use is made of a change of gear and, at that moment, the engine speed is monitored before and after the gear change. It is then assumed that the speed of the vehicle is substantially constant before and after this gear change because, on the one hand, this change is made in a short period of time and, on the other hand, the acceleration of the vehicle is usually moderate. It makes no difference whether the speed after the change of gear is divided by the speed before the change of gear or vice versa. Taking account of the staging of the gearbox, it is then possible to determine the engaged gearbox ratio after the change of gear.

When the engine is coupled to the gearbox via a clutch or similar element, then the change of gear is detected for example by a sensor placed on this clutch. This sensor is advantageously a contactor, which cost is usually low. For the determination of the engaged gear, the value of the engine speed is then preferably stored on each change of state of the contactor.

The present invention relating to determining the engaged gearbox ratio in a gearbox may be applied to determining the speed of a vehicle.

Thus, the invention proposes a method for determining the speed of a vehicle with the aid of sensors on board the vehicle, the vehicle being moved by an engine coupled to a gearbox.

According to the invention, the speed of the vehicle is determined by multiplying the value of the engine speed obtained via a sensor by a predetermined coefficient as a function of the engaged gearbox ratio, and the engaged gearbox ratio is determined by applying a method as described hereinabove.

A method for determining the speed of a vehicle according to the invention may be used in degraded mode only or permanently. Degraded mode is a mode in which a speed sensor, usually designed to give the speed of the vehicle, no longer performs its function.

When this method is used permanently, the calculated speed is preferably compared with the value of the speed measured by a speed sensor. In this manner, it is possible to ascertain at any moment the engaged gearbox ratio and it is also possible to check the sensors used for determining the speed in order to detect a possible failure.

Details and advantages of the present invention will better emerge from the following description, made with reference to the appended schematic drawing in which:

BRIEF DESCRIPTION OF THE DRAWINGS

The single FIGURE represents schematically a top view of a motor vehicle.

DETAILED DESCRIPTION OF THE INVENTION

The FIGURE shows a motor vehicle 2 represented very schematically. An arrow at the front of the latter represents its normal direction of movement. This vehicle has four wheels 4. The two front wheels 4 are drive wheels and are driven by an engine 6 via a gearbox 8 coupled to the engine 6 via a clutch 10.

A speed sensor, placed for example at the output shaft of the gearbox 8, makes it possible to determine the speed of the vehicle. This speed sensor also makes it possible to determine the distance traveled by the vehicle. Thus, these two items of information are supplied first to the driver by means of a tachymeter and a milometer placed on the dashboard of the vehicle 2. These items of information are subsequently also used by electronic devices on board the vehicle 2 such as for example a speed regulator, a device managing the maintenance operations to be performed, etc. To alleviate a possible failure of this speed sensor, the present invention proposes to measure the speed of the vehicle with the aid of other sensors usually available on a motor vehicle.

In the embodiment proposed, a sensor determines the speed N of the engine 6. Another sensor makes it possible to determine whether the clutch is in the engaged or disengaged position. This sensor is placed for example at the clutch mechanism 10. It is preferably a contactor which engages at the beginning of a clutch disengagement action and disengages at the end of a clutch engagement action.

An engine management and control device, which receives the information from various sensors of the vehicle, stores the value of the engine speed N on each change of state of the contactor, that is to say when the contactor engages or disengages. Other storage strategies may be envisaged. Thus the management and control device may for example store permanently, or at regular intervals, the engine speed N.

To achieve a change of ratio in the gearbox 8, the driver operates the clutch 10. At that time the speed $N_1$ is determined, just before the clutch disengagement, by measuring this speed when the contactor placed on the clutch 10 engages, and the engine speed $N_2$ is measured after clutch engagement when the contactor disengages. It is assumed that, between the measurements of the values $N_1$ and $N_2$, the speed of the vehicle has changed little. Then, by determining the ratio $N_2/N_1$, it is determined which new gear is engaged. Specifically, the mechanical reduction ratios of the gearbox 8 are all known. It is therefore known, at a constant speed, when the engine speed has a value $N_0$, which is the value $N_0'$ of this speed after the ratio of the gearbox 8 has changed. It is therefore possible in this way to determine, reversely, as a function of the engine speed $N_0'$ measured after the change of ratio and knowing $N_0$, the engaged gear.

Once the engaged gear and the engine speed are known, it is very simple to determine the speed of the vehicle. Specifically, for each ratio of the gearbox 8, the vehicle speed is determined for a given engine speed, for example 1,000 revolutions per minute (rpm). If, on the last ratio of the gearbox 8, the speed of the vehicle is thus 40 km/h, the speed of the vehicle when the engine speed is 3 250 rpm will then be 40*3,250/1,000=130 km/h.

Preferably, the speed as a function of the engine speed and of the engaged gearbox ratio is calculated permanently. The engaged gearbox ratio is in this manner known at all times. Thus, when the main speed sensor fails, the engaged ratio is known and the calculation in degraded mode may immediately take over from the normal speed calculation, without even awaiting a change of gearbox ratio.

Permanently calculating the speed as a function of the engine speed and engaged box ratio may also make it possible to detect the failure of a sensor.

The present invention is not limited to the embodiment described hereinabove as a nonlimiting example. It also relates to all the variant embodiments within the scope of those skilled in the art within the context of the following claims.

This method may naturally also operate with a vehicle fitted with an automatic gearbox. In this case, the clutch is replaced by a converter which performs the same role as the clutch in vehicles fitted with a manual gearbox.

The invention claimed is:

1. Method for determining the engaged box ratio in a gearbox, wherein the engaged gearbox ratio is determined when there is a change of gearbox ratio by dividing one by the other the values of an engine speed measured just before and just after the change of gear and by comparing the result of this division with stored predetermined values that depend on the gearbox (8) fitted to a vehicle.

2. The method for determining the engaged box ratio as claimed in claim 1, wherein said gearbox (8) is coupled to the engine (6) via a clutch (10), and wherein the change of gearbox ratio is detected by a sensor placed on this clutch (10).

3. A method for determining the speed of a vehicle with the aid of sensors on board the vehicle, the vehicle being moved by an engine (6) coupled to a gearbox (8), wherein the speed of the vehicle is determined by multiplying the value of the engine speed (N) obtained via a sensor by a predetermined coefficient as a function of the engaged gearbox ratio, and wherein the engaged gearbox ratio is determined by applying a method as claimed in claim 2.

4. The method for determining the engaged box ratio as claimed in claim 2, wherein the sensor placed on the clutch (10) is a contactor.

5. A method for determining the speed of a vehicle with the aid of sensors on board the vehicle, the vehicle being moved by an engine (6) coupled to a gearbox (8), wherein the speed of the vehicle is determined by multiplying the value of the engine speed (N) obtained via a sensor by a predetermined coefficient as a function of the engaged gearbox ratio, and wherein the engaged gearbox ratio is determined by applying a method as claimed in claim 4.

6. The method for determining the engaged box ratio as claimed in claim 4, wherein the value of the engine speed is stored on each change of state of the contactor.

7. A method for determining the speed of a vehicle with the aid of sensors on board the vehicle, the vehicle being moved by an engine (6) coupled to a gearbox (8), wherein the speed of the vehicle is determined by multiplying the value of the engine speed (N) obtained via a sensor by a predetermined coefficient as a function of the engaged gearbox ratio, and wherein the engaged gearbox ratio is determined by applying a method as claimed in claim 6.

8. A method for determining the speed of a vehicle with the aid of sensors on board the vehicle, the vehicle being moved by an engine (6) coupled to a gearbox (8), wherein the speed of the vehicle is determined by multiplying the value of the engine speed (N) obtained via a sensor by a predetermined coefficient as a function of the engaged gearbox ratio, and wherein the engaged gearbox ratio is determined by applying a method as claimed in claim 1.

9. The method for determining the speed of a vehicle as claimed in claim 8, wherein it is applied only in a degraded mode.

10. The method for determining the speed of a vehicle as claimed in claim 8, wherein it is applied permanently.

11. The method for determining the speed of a vehicle as claimed in claim 10, wherein the calculated speed is compared with the value of the speed measured by a speed sensor.

* * * * *